United States Patent

[11] 3,563,598

[72] Inventors: Karl Wilfert, Gerlingen-Waldstadt, Germany; Hans Gotz, Magstadt Wurttemberg, Germany
[21] Appl. No.: 751,238
[22] Filed: Aug. 8, 1968
[45] Patented: Feb. 16, 1971
[73] Assignee: Daimler-Benz Aktiengesellschaft, Stuttgart-Unterturkheim, Germany
[32] Priority: Aug. 8, 1968
[33] Germany
[31] 53790

[54] INSTALLATION FOR THE REDUCTION OF SOILING OF REAR LIGHTS OR THE LIKE AT MOTOR VEHICLE BODIES
14 Claims, 4 Drawing Figs.

[52] U.S. Cl. .................................................... 296/28; 240/8.3
[51] Int. Cl. .................................................... B60q 1/00
[50] Field of Search .......................................... 296/28, 91, 1(S); 280/152; 240/7.1, 8.3, 8.1

[56] References Cited

UNITED STATES PATENTS

| 1,742,116 | 12/1929 | Wright | 240/7.1 |
| 2,199,883 | 5/1940 | Ishiwata | 296/1(S)X |
| 2,725,944 | 12/1955 | Lee et al. | 296/1(S)UX |

FOREIGN PATENTS

| 980,180 | 12/1950 | France | 280/152 |
| 162,423 | 3/1958 | Sweden | 240/8.3 |

Primary Examiner—Benjamin Hersh
Assistant Examiner—John A. Pekar
Attorney—Craig, Antonelli, Stewart & Hill ABSTRACT: An installation for reducing the soiling of rear lights or the like at motor vehicle bodies by means of an air guide system which includes air guide channels extending on the inside of the body; air enters the air guide channels by way of inlet apertures provided laterally of the body and is discharged out of the air guide channels by way of annularly shaped discharge apertures surrounding the rear lights.

PATENTED FEB 16 1971

3,563,598

INVENTORS
KARL WILFERT
HANS GÖTZ

BY Craig & Antonelli

ATTORNEYS

3,563,598

INSTALLATION FOR THE REDUCTION OF SOILING OF REAR LIGHTS OR THE LIKE AT MOTOR VEHICLE BODIES

The present invention relates to an installation for the reduction of the soiling of rear lights or the like in the motor vehicle bodies, with air guide installations that terminate within the area of the rear lights as described in German Patent Application D 53 598 II/63c, filed in Germany on July 14, 1967, in the name of the assignee of the present application.

Since the rear lights of motor vehicles are exposed to a relatively strong soiling as a result of dust stirred up from the road or of other dirt particles thrown up or of insects, it has been proposed in the aforementioned copending patent application to provide air guide installations connected with the body which terminate within the area of the rear lights and preferably begin at such places of the body at which a hydrodynamic pressure occurs during the drive. On the one hand, the formation of turbulence and the stirring-up of the dust connected therewith is to be prevented thereby on the rear side of the motor vehicle within the area of the rear lights and, on the other, an airflow is to be achieved within the area of the rear lights which far-reachingly prevents a contact by the air enriched with dust and dirt with the rear lights.

In further development of the subject matter of the aforementioned copending application, the present invention is concerned with the aim to provide within the area of the rear lights an airflow that also with a strong turbulence of dust or the like, prevents a deposit of dust or dirt particles on the rear lights and which may even cause a certain cleaning action, if necessary. The present invention essentially consists in that the air guide installations are constructed as air guide channels extending on the inside of the body which are provided with annularly shaped discharge apertures surrounding the rear lights and with inlet apertures provided laterally at the body. An air stream directed away from the rear lights is produced thereby which far-reachingly prevents a deposit of dirt and dust particles at the rear lights. Advantageously, the inlet apertures of the air guide channels may protrude laterally beyond the contour of the vehicle. It is assured in this manner that a sufficiently large air quantity enters into the air guide channels.

In order to increase the flow velocity of the discharged air, provision may also be made that the discharge apertures of the air guide channels are provided with annular orifices or the like tapering nozzlelike which are placed about the rear lights. Additionally, the inlet cross section may be larger than the discharge cross section surrounding the rear lights in an annularly shaped manner. Appropriately, the inlet aperture may be provided with inlet sheet metal guide plates and/or with cover screens or the like.

According to a still further development and feature of the present invention, the rear lights may be provided at the back side thereof with a streamlined rear wall which projects into the air guide channel. An extraordinarily favorable and far-reachingly loss-free flow is made possible by this type of construction. In order to render the supplied air quantity independent of the driving velocity, provision may further be made that auxiliary blowers are provided in the air guide channel or channels for the increase of the flow velocity.

Accordingly, it is an object of the present invention to provide an installation for reducing the soiling of rear lights or the like at motor vehicle bodies which is characterized by greater effectiveness for its intended purposes.

Another object of the present invention resides in an installation for reducing the soiling of rear lights or the like in motor vehicle bodies which avoids by extremely simple means the aforementioned drawbacks encountered in the prior art constructions.

A further object of the present invention resides in an installation of the type described above which prevents a deposit of dirt and dust particles on the rear lights even in case of strong turbulence within the area of the rear lights.

Another object of the present invention resides in an installation for the reduction of the soiling of rear lights which produces even a certain cleaning effect by the airflow of the system.

A still further object of the present invention resides in an air guide installation reducing the soiling of rear lights which assures a sufficient amount of air to preclude soiling under all driving conditions.

These and further objects, features, and advantages of the present invention will become more obvious from the following description when taken in connection with the accompanying drawing which shows, for purposes of illustration only, several embodiments in accordance with the present invention, and wherein.

Figure 1:
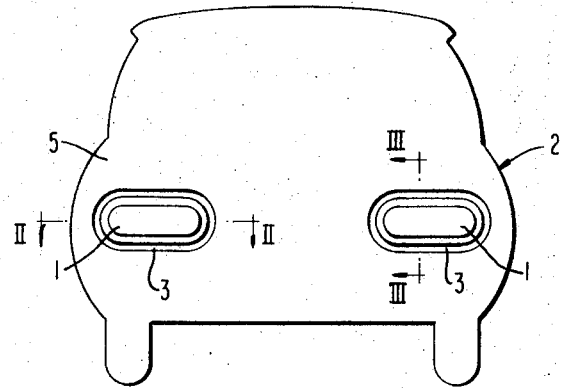
FIG. 1 is a schematic rear view of a motor vehicle equipped with an antisoiling installation for its rear lights according to the present invention.
Figure 2:
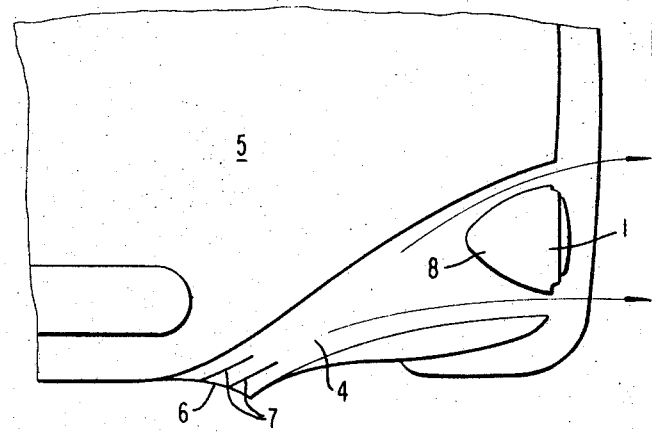
FIG. 2 is a partial cross-sectional view, on an enlarged scale, taken along line II–II of FIG. 1.
Figure 3:
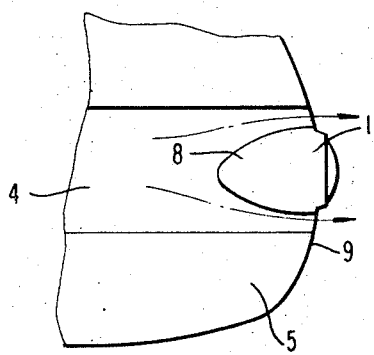
FIG. 3 is a partial cross-sectional view, on an enlarged scale, taken along line III–III OF FIG. 1.

Referring now to the drawing wherein like reference numerals are used throughout the various views to designate like parts, and more particularly to FIG. 1, the rear lights 1 illustrated in this figure are normally constructed as multichamber or cluster lights which are arranged horizontally in the motor vehicle 2 of the embodiment illustrated in FIGS. 1 to 3. The rear lights 1 are arranged in the discharge apertures 3 of air guide channels 4. These air guide channels 4 extend on the inside of the body 5 and possess lateral inlet apertures 6. These inlet apertures 6 which protrude beyond the contour of the body 5 may be so arranged—for example, laterally so high-—that the dust or dirt thrown up by the vehicle itself cannot enter into the inlet apertures 6. The inlet apertures 6 are provided with sheet metal guide plates 7 and may be additionally equipped with cover screens. In order to obtain discharge velocities, which are as large as possible, on the part of the air conducted through the air guide channels 4, the cross sections of the annularly shaped orifices 3 are kept smaller than the cross section of the inlet apertures 6. The rear walls 8 of the rear lights 1 are constructed in a streamlined manner and form together with the walls of the air guide channels 4 annular, nozzlelike discharge apertures. Air flows are made possible thereby which encounter only slight losses.

In the embodiments according to FIGS. 2 and 3, the air is discharged out of the annularly shaped discharge apertures 3 approximately perpendicularly to the rear wall 9 of the vehicle. The vacuum which commonly occurs at least within the area of the rear lights 1, is thereby reduced so that a turbulence is avoided thereat which is essentially responsive for the soiling of the rear lights 1.

Figure 4:
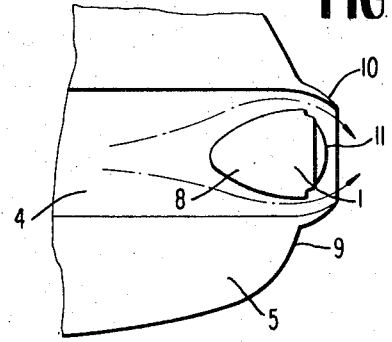
FIG. 4 is a partial cross-sectional view, similar to FIG. 3, of a modified embodiment in accordance with the present invention.

In the embodiment according to FIG. 4, in contradistinction thereto, the walls 10 of the air guide channel 4 are extended rearwardly beyond the rear lights 1 in such a manner that they deflect the discharged air toward the center of the rear light 1. As a result thereof, air flows about a large area of the surface of the light outlet 11 of the rear light 1 whereby additionally dust particles may be blown off from this surface which may have been deposited thereat, for example, during standstill of the vehicle 2.

With these embodiments, the discharged air quantity is essentially dependent on the velocity of the vehicle 2 because the dynamic air pressure and the entering air quantity is determined thereby. In order to become independent of the driving velocity and to blow always a minimum air quantity out of the discharge apertures 3 and the rear lights 1, conventional blowers or fans (not shown) may be provided within the air guide channels 4.

While we have shown and described several embodiments in accordance with the present invention, it is understood that the same is not limited thereto but is susceptible of numerous changes and modifications as known to a person skilled in the art, and we therefore do not wish to be limited to the details shown and described herein.

We claim:

1. An installation for reducing the soiling of rear lights or the like at motor vehicles bodies with air guide installations which terminate within the area of the rear lights, characterized in that the air guide installations include air guide channel means extending on the inside of the body and having approximately annularly shaped discharge aperture means substantially surrounding the rear lights and inlet aperture means provided laterally at the body, wherein the discharge aperture means of the air guide channel means are provided with tapering, nozzlelike annular orifices which are disposed about the rear lights.

2. An installation according to claim 1, wherein the inlet cross section of the air guide channel means is larger than the discharge cross section surrounding the rear lights.

3. An installation according to claim 2, wherein the inlet aperture means are provided with cover screen means.

4. An installation according to claim 2, wherein the inlet aperture means are provided with inlet guide plate means.

5. An installation according to claim 4, wherein the inlet aperture means are provided with cover screen means.

6. An installation according to claim 5, wherein the rear lights include rear walls constructed on their back side as a streamlined surface and which extend into the air guide channel means.

7. An installation according to claim 6, further comprising blower means in the air guide channel means for increasing the flow velocity.

8. An installation according to claim 1, wherein the inlet aperture means are provided with inlet guide plate means.

9. An installation according to claim 3, wherein the inlet aperture means are provided with cover screen means.

10. An installation according to claim 1, wherein the rear lights include rear walls constructed on their back side as a streamlined surface and which extend into the air guide channel means.

11. An installation according to claim 1, further comprising blower means in the air guide channel means for increasing the flow velocity.

12. An installation according to claim 1, wherein the inlet aperture means of the air guide channel means protrude laterally beyond the contour of the body.

13. An installation according to claim 12, wherein the inlet aperture means are provided with cover screen means.

14. An installation according to claim 13, wherein the inlet cross section of the air guide channel means is larger than the discharge cross section surrounding the rear lights.